(12) United States Patent
Bowers

(10) Patent No.: US 7,000,940 B2
(45) Date of Patent: Feb. 21, 2006

(54) EQUALIZED REAR SUSPENSION FOR MULTI-USE VEHICLE

(75) Inventor: Lee N. Bowers, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 104 days.

(21) Appl. No.: 10/383,148

(22) Filed: Mar. 6, 2003

(65) Prior Publication Data

US 2003/0184056 A1    Oct. 2, 2003

Related U.S. Application Data

(60) Provisional application No. 60/368,605, filed on Mar. 29, 2002.

(51) Int. Cl.
*B60G 5/04*    (2006.01)

(52) U.S. Cl. .............. 280/676; 280/124.128; 280/124.132

(58) Field of Classification Search ............... 280/676, 280/683, 685, 687, 124.128, 124.132, 124.116; 180/348, 359
See application file for complete search history.

(56) References Cited

U.S. PATENT DOCUMENTS

| | | | | |
|---|---|---|---|---|
| 2,493,024 A | * | 1/1950 | Pointer | 280/685 |
| 2,767,999 A | * | 10/1956 | Gouirand | 280/683 |
| 3,521,527 A | | 7/1970 | Gies et al. | |
| 3,602,470 A | | 8/1971 | Reynolds | |
| 3,724,397 A | | 4/1973 | Sargent | |
| 3,746,361 A | * | 7/1973 | McGee | 280/683 |
| 3,856,325 A | | 12/1974 | Willets | |
| 3,894,597 A | | 7/1975 | Wagner | |
| 3,948,334 A | | 4/1976 | Danielson et al. | |
| 3,977,700 A | * | 8/1976 | Leaf | 280/685 |
| 3,982,598 A | | 9/1976 | Purcell et al. | |
| 4,030,738 A | | 6/1977 | Willetts | |
| 4,043,417 A | | 8/1977 | Orpana | |
| 4,153,265 A | | 5/1979 | McColl | |
| 4,155,570 A | | 5/1979 | Wiley, Jr. | |
| 4,227,711 A | | 10/1980 | Wheeler | |
| 4,252,340 A | * | 2/1981 | Egging | 280/683 |
| 4,360,220 A | | 11/1982 | Beers | |
| 4,364,443 A | | 12/1982 | Sato et al. | |
| 4,429,898 A | | 2/1984 | Bedenbender et al. | |
| 4,516,649 A | | 5/1985 | Braathen | |
| 4,519,654 A | | 5/1985 | Satzler et al. | |
| 4,582,153 A | | 4/1986 | Shinsen | |
| 4,623,162 A | * | 11/1986 | Weitzenhof et al. | 280/687 |
| 4,811,972 A | | 3/1989 | Wiley, Jr. | |
| 4,923,257 A | | 5/1990 | Purcell | |
| 4,974,684 A | | 12/1990 | Stevens | |

(Continued)

*Primary Examiner*—Eric Culbreth
(74) *Attorney, Agent, or Firm*—Rankin, Hill, Porter & Clark LLP; Christen Millard

(57) ABSTRACT

An equalized suspension system for a vehicle includes a first trailing arm, a second trailing arm, first and second wheels, and a cushion. The first trailing arm has a lower end pivotally secured to the first wheel, and an upper end pivotally secured to the frame. The second trailing arm has a lower end pivotally secured to the second wheel, a free upper end, and an intermediate portion pivotally secured to the frame. The cushion extends between the lower end of the first trailing arm and the free, upper end of the second trailing arm and serves to transfer and equalize pressures between the first and second wheels. When the first wheel engages an obstacle and moves in a first direction, the cushion forces the second wheel, via the second trailing arm, in a second direction.

11 Claims, 1 Drawing Sheet

U.S. PATENT DOCUMENTS

| | | |
|---|---|---|
| 4,987,965 A | 1/1991 | Bourret |
| 5,016,905 A | 5/1991 | Licari |
| 5,064,011 A | 11/1991 | Ogano et al. |
| 5,076,378 A | 12/1991 | Lagace |
| 5,113,958 A | 5/1992 | Holden |
| 5,186,485 A * | 2/1993 | Orr et al. .................... 280/678 |
| 5,293,948 A | 3/1994 | Crabb |
| 5,482,326 A | 1/1996 | Levi |
| 5,566,773 A | 10/1996 | Gersmann |
| 5,575,347 A | 11/1996 | Uchibaba et al. |
| 5,791,681 A | 8/1998 | VanDenberg |
| 5,975,226 A | 11/1999 | Matsumoto et al. |

* cited by examiner

EQUALIZED REAR SUSPENSION FOR MULTI-USE VEHICLE

BACKGROUND OF THE INVENTION

1. Field of the Invention

The present invention relates to vehicle suspensions and, more particularly, toward equalized suspension systems for vehicles.

2. Description of Related Art

It is known to independently suspend wheels from a vehicle frame. An independently suspended wheel is able to move in one or more directions without affecting the movement of any other wheels. It is desirable to independently suspend wheels to improve the ride of the vehicle when traveling over a road or ground that may be uneven. Often, a track is used on each side of the vehicle.

It is also known to suspend beams from vehicles. In a typical configuration, a beam is suspended on each side of a vehicle. Two or more wheels are attached to the beam. Typically, the beams are interconnected by one or more axles or other structures so that the beams move together relative to the frame. These types of structures are normally used in areas where the terrain is likely to be substantially level.

Such structures are unsatisfactory for use in an off-road setting. Typically, a multi-use vehicle (MUV) is used in an area where there are substantial differences in terrain on both sides of the vehicle. In an MUV setting, an independent suspension would be particularly desirable since the variations in the level of the ground can be substantial.

It is also desirable for a vehicle to include a system for evenly distributing, or equalizing, the force on the wheels on one side of a vehicle. The use of such a suspension system to equalize the pressure on the wheels allows for an improved load distribution. Either of the wheels can then provide a drive force. In addition, the equalized load reduces the probability of one wheel slipping. This further reduces the need for limited slip or locking differentials. In addition, the distribution of the force reduces the probability of the vehicle becoming stuck due to high loading on one wheel on terrain such as soft soil or snow.

None of the suspension systems known in the art and described hereinbefore are acceptable for use on an MUV. Specifically, none of the known systems provide an independent suspension for a vehicle wherein the pressure on the wheels on either side of the vehicle is equalized, as may be desirable during operation of the vehicle over soft or slippery terrain. There further exists a need in the art for an MUV suspension that equalizes pressures on wheels on each side of the vehicle.

SUMMARY OF THE INVENTION

The present invention includes a number of components. The vehicle includes a frame having a first side and a second side. A first suspension system is disposed on the first side of the frame and a second suspension system, which is substantially identical to the first suspension system but separate therefrom, is disposed on the second side of the frame.

In further accordance with the present invention, each suspension system is associated with first and second wheels and includes a first and second trailing arms. Each trailing arm is attached to the frame and one of the wheels. A single cushion extends between the first and second trailing arms and serves to equalize pressures experienced by the first and second wheels.

In further accordance with the present invention, a first trailing arm has a lower end that rotatably secures the first wheel and an upper end pivotally secured to the frame. The second trailing arm has a lower end that rotatably secures the second wheel, an intermediate portion pivotally secured to the frame, and a free upper end. The cushion extends between the lower end of the first trailing arm and the upper end of the second trailing arm.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
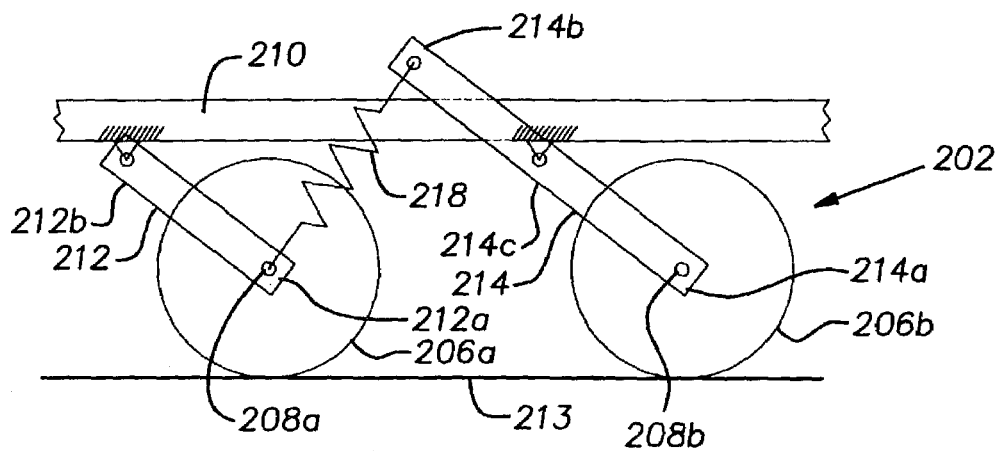
FIG. 1 is a schematic side view of a particular embodiment of a suspension system according to the present invention; and, FIGS. 2 and 3 schematically illustrate the suspension system of FIG. 1 while traversing an obstacle.

The present invention relates to a suspension system for a multi-use vehicle. Initially, it is noted that the drawings are not to scale, but will be more easily understood by a person of ordinary skill in the art than drawings from another perspective or drawings shown in proper proportion. It is further noted that the drawings do not show any other structures attached to the vehicle, nor do they show any structures necessary for the functioning of the vehicle that are not directly related to the suspension structure disclosed. Accordingly, the vehicle shown in the drawing figures may not be functional without the other parts, such as a drive train and the like. However, any drive train that may be used in connection with the present structure is relatively conventional in nature. A person of ordinary skill in the art can easily adapt a known MUV drive train for use in connection with the present vehicle. Further, as the drawings only depict the rear portion of the vehicle, the conventional front or steered wheels are not shown herein. Moreover, the depicted vehicle may be a trailer that is towed behind another vehicle, the trailer being adapted, as described hereinafter, for use in an off-road setting.

FIG. 1 illustrates a preferred embodiment of a suspension system in accordance with the present invention. This suspension system is useful when there is a desire for the wheels on one side of a vehicle to move independently of those on the other side of the vehicle. FIG. 1 illustrates the inventive suspension on a first side of the vehicle, it being noted that the suspension system on the second or opposite side of the vehicle is identical thereto. Accordingly, the vehicle may be considered to be symmetrical about a longitudinal centerline.

Moreover, the suspension system described hereinafter illustrates just a portion of the vehicle, it being apparent that other portions of the vehicle may be conventional and within the knowledge of those skilled in the art. For example, the suspension system may be used on a vehicle incorporating a pair of front wheels (not shown) that are steered by the driver and, accordingly, the wheels associated with the suspension system are referred to hereinafter as a first or mid wheel and a second or rear wheel. Further, at least one of the mid and rear wheels may be powered by drive means (not shown), which may be conventional in nature. Alternatively, the vehicle may be used as a trailer in which neither the mid wheels nor the rear wheels are powered, as mentioned hereinbefore.

The suspension system 202 includes a mid wheel 206a and a rear wheel 206b. The mid wheel 206a is rotatably secured to a mid axle 208a while the rear wheel 206b is rotatably secured to a rear axle 208b. The mid and rear axles 208a, 208b do not extend across the width of the vehicle. Rather, separate mid and rear axles 208a, 208b are provided for each suspension system (i.e., half axles). Accordingly, the suspension system on the first side of the vehicle may be considered to be independent or separate from the suspension system on the second side of the vehicle.

A first or forward trailing arm 212 extends forwardly from the mid wheel 206a, and is pivotally secured to the frame 210. More specifically, a lower end 212a of the forward trailing arm 212 rotatably secures the mid wheel 206a, while an upper end 212b of the forward trailing arm 212 is pivotally secured to the frame 210.

Similarly, a second or rearward trailing arm 214 extends forwardly from the rear wheel 206b and is pivotally attached to the frame 210. More specifically, the rearward trailing arm 214 has a lower end 214a, an upper end 214b, and an intermediate portion 214c. The rearward trailing arm lower end 214a rotatably secures the rear wheel 206b, while the intermediate portion 214c is pivotally secured to the frame 210. Accordingly, the rearward trailing arm 214 extends upwardly and forwardly from the frame 210 toward the upper end 214b thereof.

Preferably, the forward and rearward trailing arms 212, 214 are secured around the mid and rear axles 208a, 208b, respectively. Alternatively, the forward and rearward trailing arms may be secured to support structures disposed adjacent the wheels, such as a short support rail (not shown) associated with each wheel 206a, 206b.

As illustrated in FIG. 1, the rearward trailing arm 214 is longer than the forward trailing arm 212. A cushion 218 extends between the upper end 214b of the rearward trailing arm 214 and the lower end 212a of the forward trailing arm 212. The cushion 218 serves to equalize the pressures on each of the wheels 206a and 206b. In FIG. 1, the two trailing arms 212, 214 are illustrated in a rest position in which they are substantially parallel to one another. Furthermore, in the illustrated and most preferred embodiment, the cushion 218, in its rest position, is perpendicular to both arms 212, 214.

The upper or free end 214b of the rearward trailing arm 214 extends upwardly past the frame 210 and, for ease of design, preferably extends on the outside of the frame 210. The angle at which the cushion 218 meets the arms 212, 214 depends upon the spacing between the wheels 206a, 206b and the length of the arms 212, 214. It is desirable to adjust these features to accommodate the desired perpendicular orientation of the cushion 218, as this orientation provides the greatest initial force between the wheels and, therefore, the best result. Finally, it is most desirable for the rear arm 214 to be twice the length of the front arm 212. This provides for the attachment of the rearward trailing arm 214 to the frame 210 at about the midpoint of the rear trailing arm. The need for such an orientation will be better understood after a description of the operation of the suspension system.

Figure 2:
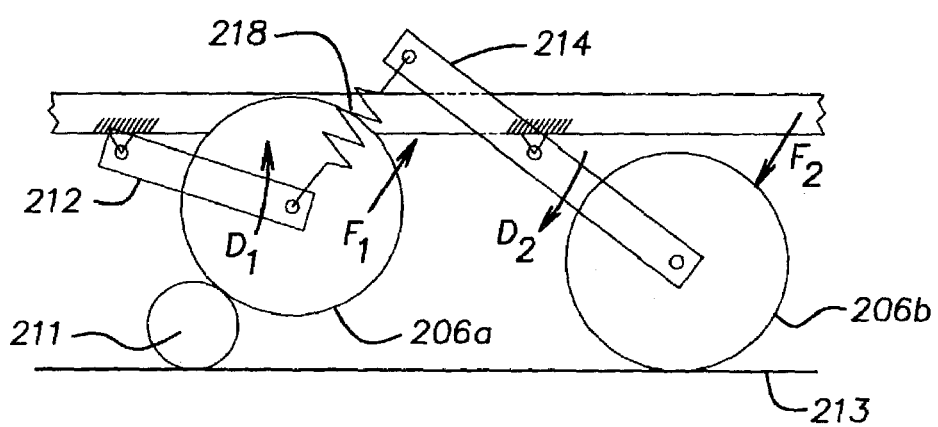

When one of the wheels 206a, 206b encounters an obstacle 211, such as a log, the pressure on the wheels 206a, 206b tends to remain equalized. For example and with reference to FIG. 2, if the mid wheel 206a encounters an obstacle 211, the mid wheel 206a will move upwardly and the forward trailing arm 212 will rotate in a counter-clockwise direction (D1) as the mid wheel 206a travels over the obstacle 211. In this regard it is noted that the movement of the mid wheel 206a is not purely vertical, but rather will trace an arc, the radius of which is defined by the distance between the movable connections of the lower and upper ends 212a, 212b of the forward trailing arm 212.

The movement of the forward trailing arm 212 will tend to compress the cushion 218, which will, in turn, affect the rear wheel 206b by urging or biasing the rearward trailing arm 214 in a clockwise direction ($D_2$). This is accomplished through the lever action at the upper or free end 214b of the rearward trailing arm 214 whereby the rearward trailing arm 214 rotates or pivots about the pivotal connection between the frame 210 and the rearward trailing arm intermediate portion 214c. If the rear wheel 206b is on the ground surface 213 during the foregoing operation, the rear wheel 206b is pressed against the ground surface 213 by the application of pressure from the cushion 218 against the upper end 214b of the rearward trailing arm 214. The rear wheel will be urged to move in a clockwise direction ($D_2$) but, due to the engagement with the ground surface 213, will remain in the illustrated position.

As will be appreciated by those skilled in the art, in the illustrated embodiment the force ($F_1$) experienced at the mid wheel 206a against the obstacle 211 will be generally equal to the force ($F_2$) applied to the rear wheel 206b against the ground surface 213. Further, the force ($F_2$) applied at the rear wheel 206b can be adjusted relative to the force ($F_1$) experienced at the mid wheel 206a by adjusting the length of the rearward trailing arm 214, the relative location along the length of the rearward trailing arm of the pivotal connection with the frame 210, and the angular orientation of the cushion relative to the trailing arms 212, 214. Accordingly, although it is preferred that the forces ($F_1$, $F_2$) be equalized, it is contemplated that relatively more or less force could be experienced at one of the mid and rear wheels, if desired.

Figure 3:
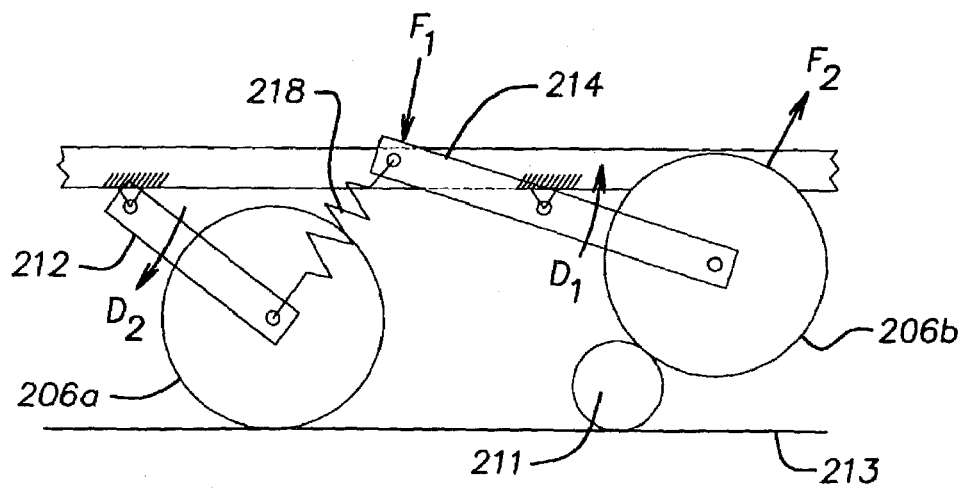

This system therefore increases the pressure between the rear wheel 206b and the mid wheel 206a, by increasing the pressure on the rear wheel to be substantially similar to that of the mid rear wheel. A similar action results for each deflection and return of a wheel 206a, 206b to or from any specified location to which it may travel, such as may occur when the rear wheel 206b encounters an obstacle, as shown in FIG. 3. By the use of this system, the force on the two wheels 206a, 206b on each side of a vehicle is equalized, creating the benefits described above.

It is noted that the use of such a system requires additional modifications to the standard configuration. Of particular note is the need for the stop structures (not shown) that mount the trailing arms 212, 214 to the frame 210. Such stop structures will define a maximum range of movement of the trailing arms 212, 214, and hence the wheels 206a, 206b.

In a standard suspension system used in a typical MUV, the cushions restrict the ability of any given wheel to deflect from its rest position, because the cushion is typically attached to both the frame and the wheel area. However, in the present system, the cushion 218 provides no such resistance to deflection. Instead, the cushion 218 simply equalizes the force between the wheels 206a, 206b. Accordingly, one or more stops should be included on the frame 210 to prevent either arm 212, 214 from deflecting too greatly from its rest position, and thereby prevent other damage to the vehicle. For example, should at least one of the mid and rear wheels 206a, 206b be a driven wheel, there will be a maximum range of motion that the drive axle can traverse.

The stop structures for the trailing arms 212, 214 will be positioned to prevent the mid and/or rear wheels from moving outside of the associated drive axle's maximum range of motion.

Although the present invention has been described with particularity herein, it is considered apparent that the present invention is capable of numerous modifications, improvements, and substitutions of parts and therefore is not limited to the particular preferred embodiments described herein. Rather, the invention is only to be defined by the claims appended hereto.

What is claimed is:

1. A multi-use vehicle, comprising:
   a frame having a first side and a second side;
   a first suspension system disposed on the first side of the frame; and,
   a second suspension system substantially separate from the first suspension system and disposed on the second side of the frame;
   wherein each of said first and second suspension systems comprises:
     a first wheel and a second wheel;
     a first axle receiving said first wheel and a second axle receiving said second wheel;
     a first trailing arm having a first end secured to the first axle and a second end pivotally secured to the frame;
     a second trailing arm having a first end and a second end, said second trailing arm first end being secured to the second axle, said second trailing arm being pivotally secured to the frame at about a midpoint of the second trailing arm, wherein the second end of said second trailing arm is disposed above said frame; and,
     a cushion extending between the second end of the second trailing arm and the first end of the first trailing arm, said cushion being secured to the first end of the first trailing arm at a location adjacent to said first axle and serving to equalize pressures experienced at said first and second wheels.

2. The multi-use vehicle according to claim 1, wherein said first wheels are mid wheels and said second wheels are rear wheels of said vehicle.

3. The multi-use vehicle according to claim 1, wherein the first and second ends of each said first trailing arm are each respectively a lower end and an upper end, said first wheels each being rotatably secured to the respective first axle secured to the respective lower end and each said upper end being pivotally secured to the frame.

4. The multi-use vehicle according to claim 3, wherein the first and second ends of each said second trailing arm are each respectively a lower end and an upper end, and an intermediate portion disposed between said second trailing arm upper and lower ends comprises the midpoint, said intermediate portion being pivotally secured to said frame.

5. The multi-use vehicle according to claim 4, wherein each said cushion extends between said lower end of each respective said first trailing arm and said upper end of each respective said second trailing arm.

6. The multi-use vehicle according to claim 5, wherein each respective said first trailing arm has a first length and each respective said second trailing arm has a second length, said second length being greater than said first length.

7. The multi-use vehicle according to claim 6, wherein, when each respective said first wheel engages an obstacle, each respective said first trailing arm rotates in a first direction and each respective said second trailing arm is forced in a second, opposite direction.

8. A suspension system for suspending first and second wheels from a frame of a vehicle, comprising:
   a first axle receiving said first wheel and a second axle receiving said second wheel;
   a first trailing arm having a lower end and an upper end, said first trailing arm lower end being secured to said first axle, said first trailing arm upper end being pivotally secured to the frame;
   a second trailing arm having a lower end, an intermediate portion, and an upper end, said second trailing arm lower end being secured to the second wheel and said second trailing arm intermediate portion being secured to the frame, and said second trailing arm upper end being disposed vertically above said frame; and,
   a cushion having a lower end secured to said first trailing arm lower end and an upper end secured to said second trailing arm upper end, said cushion serving to transfer and equalize pressures experienced by said first and second wheels.

9. The suspension system according to claim 8, wherein said first trailing arm has a first length and said second trailing arm has a second length, said second length being greater than said first length.

10. The suspension system according to claim 9, wherein, when said first wheel engages an obstacle, said first trailing arm rotates in a first direction and said second trailing arm is forced in a second, opposite direction.

11. The suspension system according to claim 9, wherein, when one of said first and second wheels moves in a first direction the other of said first and second wheels moves in a second direction.

* * * * *